US012143771B2

(12) United States Patent
Walker et al.

(10) Patent No.: US 12,143,771 B2
(45) Date of Patent: Nov. 12, 2024

(54) SUSPENSION FOR MOVING MAGNET ACTUATOR

(71) Applicant: Google LLC, Mountain View, CA (US)

(72) Inventors: Jason David Walker, Mountain View, CA (US); Timothy A. Gladwin, Mountain View, CA (US); Rajiv Bernard Gomes, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/500,835

(22) Filed: Nov. 2, 2023

(65) Prior Publication Data

US 2024/0129672 A1 Apr. 18, 2024

Related U.S. Application Data

(63) Continuation of application No. 17/626,861, filed as application No. PCT/US2020/043238 on Jul. 23, 2020, now Pat. No. 11,843,912.

(Continued)

(51) Int. Cl.
*H04R 11/02* (2006.01)
*H04R 7/04* (2006.01)

(52) U.S. Cl.
CPC ............... *H04R 11/02* (2013.01); *H04R 7/04* (2013.01); *H04R 2400/11* (2013.01); *H04R 2499/11* (2013.01)

(58) Field of Classification Search
CPC ........ H04R 7/04; H04R 11/02; H04R 2400/11
See application file for complete search history.

(56) References Cited

U.S. PATENT DOCUMENTS 6,208,237 B1 * 3/2001 Saiki ...................... H04R 11/02 381/396
7,082,668 B2 8/2006 Ando et al.
(Continued)

FOREIGN PATENT DOCUMENTS

CN 101007305 8/2007
CN 102629815 8/2012
(Continued)

OTHER PUBLICATIONS

Agarlita et al., "Position sensorless control of a linear interior permanent magnet oscillatory machine, with experiments," Proceeding of 12th International Conference on Optimization of Electrical and Electronic Equipment, May 20-22, 2010.
Chang et al., "Design and performance research of electromagnetic active vibration absorber," Thesis for the degree of Master, Xiangtan University, Feb. 15, 2018, 2 pages (with English abstract).
(Continued)

*Primary Examiner* — Sunita Joshi
(74) *Attorney, Agent, or Firm* — Fish & Richardson P.C.

(57) ABSTRACT

An actuator module includes a baseplate extending in a plane, a voice coil connected to the baseplate, and a magnet assembly. The actuator module also includes a rigid frame attached to the baseplate, the rigid frame comprising four stubs. The actuator module further includes a pair of springs suspending the magnet assembly relative to the frame and baseplate so that the voice coil extends into the air gap, the pair of springs including a first and second spring each shaped as a loop defining an aperture sized to accommodate motion of the magnet assembly along a direction of the coil axis, the first spring being attached to the frame at a first pair of the four stubs, the second spring being attached to the frame at a second pair of the four stubs, and both being attached to separate portions of the magnet assembly.

22 Claims, 10 Drawing Sheets

Related U.S. Application Data

(60) Provisional application No. 62/894,636, filed on Aug. 30, 2019.

(56) References Cited

U.S. PATENT DOCUMENTS

| | | | |
|---|---|---|---|
| 9,137,592 B2 | 9/2015 | Yliaho et al. | |
| 2008/0304124 A1 | 12/2008 | Yoda et al. | |
| 2011/0101796 A1 | 5/2011 | Odajima et al. | |
| 2015/0222995 A1 | 8/2015 | Hori et al. | |
| 2016/0021452 A1 | 1/2016 | Tang et al. | |
| 2019/0261092 A1* | 8/2019 | Landick | H04R 7/045 |

FOREIGN PATENT DOCUMENTS

| | | |
|---|---|---|
| CN | 103329573 | 9/2013 |
| CN | 103597852 | 2/2014 |
| CN | 105281533 | 1/2016 |
| CN | 105556987 | 5/2016 |
| CN | 106170116 | 11/2016 |
| CN | 205792135 | 12/2016 |
| CN | 106576207 | 4/2017 |
| CN | 108605185 | 9/2018 |
| CN | 108696804 | 10/2018 |
| EP | 0845920 | 6/1998 |
| FR | 2977334 | 1/2013 |
| JP | 2002336786 | 11/2002 |
| JP | 2018019514 | 2/2018 |
| KR | 20020039078 | 5/2002 |

OTHER PUBLICATIONS

Fleck et al., "The Cyclic Properties of Engineering Materials," Acta metall. Mater., 1994, 42(2):365-381.
Guan, "The Relationship between Composition and Structure of Sound Panel and Acoustic Performance of Distribution Mode Loudspeaker," Thesis for the degree of Doctor, Sichuan University, Apr. 2005, 4 pages (with English abstract).
International Preliminary Report on Patentability in International Appln. No. PCT/US2020/043238, dated Mar. 1, 2022, 8 pages.
International Search Report and Written Opinion in International Appln. No. PCT/US2020/043238, dated Oct. 30, 2020, 10 pages.
Office Action in Chinese Appln. No. 202080056731.1, mailed on Nov. 7, 2023, 23 pages (with English translation).
Springsteelstock.co.uk [online], "301 Spring Temper Stainless Steel," Apr. 2014, retrieved on Apr. 12, 2022, retrieved from URL<https://springsteelstock.co.uk/stainless-spring-steel/301-spring-temper-stainless-steel/>, 5 pages.
Thyssenkrupp-materials.co.uk [online], "Stainless Steel 301 1.4310," Aug. 2020, retrieved on Apr. 12, 2022, retrieved from URL<https://www.thyssenkrupp-materials.co.uk/stainless-steel-301-14310.html/>, 2 pages.
Wright, "The High Cycle Fatigue Strength of Commercial Stainless Steel Strip," Materials Science and Engineering, Nov. 1975, 22(1976):223-230.
Office Action in Chinese Appln. No. 202080056731.1, dated Apr. 7, 2024, 10 pages (with English translation).
Office Action in Chinese Appln. No. 202080056731.1, mailed on Jul. 25, 2024, 6 pages (with English translation).

* cited by examiner

SUSPENSION FOR MOVING MAGNET ACTUATOR

CROSS-REFERENCE TO RELATED APPLICATION

This application is a continuation of pending U.S. application Ser. No. 17/626,861, filed Jan. 13, 2022, which is a U.S. National Stage application, and claims priority of International Application No. PCT/US2020/043238, filed Jul. 23, 2020, which claims the benefit of U.S. Application No. 62/894,636, filed Aug. 30, 2019, which is incorporated by reference in its entirety.

TECHNICAL FIELD

This specification relates generally to audio speakers.

BACKGROUND

Many conventional moving magnet actuators can be damaged as a result of the actuators being dropped. In particular, the voice coil and magnets of the moving magnet actuators can be fragile, making them especially prone to drop damage.

SUMMARY

Disclosed are actuator modules with improved damage resistance compared to conventional modules. The actuator modules may be suitable for panel audio loudspeakers, especially those incorporated in mobile devices (e.g., mobile phones). For example, implementations of such actuator modules feature components, such as a back plate, suspension, and a frame, which are configured to effectively dissipate a force that results from the actuator module being dropped, therefore preventing damage to the components of the actuator module.

In a general aspect, an actuator module includes a baseplate extending in a plane, a voice coil connected to the baseplate, and a magnet assembly. The actuator module also includes a rigid frame attached to the baseplate, the rigid frame comprising four stubs. The actuator module further includes a pair of springs suspending the magnet assembly relative to the frame and baseplate so that the voice coil extends into the air gap, the pair of springs including a first and second spring each shaped as a loop defining an aperture sized to accommodate motion of the magnet assembly along a direction of the coil axis, the first spring being attached to the frame at a first pair of the four stubs, the second spring being attached to the frame at a second pair of the four stubs, and both being attached to separate portions of the magnet assembly.

In a first aspect, an actuator module includes an actuator module that includes a baseplate extending in a plane and a voice coil connected to the baseplate, the voice coil defining a coil axis perpendicular to the plane. The actuator module also includes a magnet assembly that includes a first side facing the baseplate, a second side facing away from the baseplate, a first pair of sidewalls on opposing sides of the magnet assembly, and a second pair of sidewalls on opposing sides of the magnetic assembly and adjacent to the first pair of sidewalls. The actuator module further includes a rigid frame attached to the baseplate, the rigid frame including four stubs each facing a corresponding one of the sidewalls. The actuator module also includes a pair of springs suspending the magnet assembly relative to the frame and the baseplate so that the voice coil extends into the air gap. The pair of springs including a first spring shaped as a loop defining an aperture sized to accommodate motion of the magnet assembly along a direction of the coil axis, the first spring being attached to the frame at a first pair of the four stubs respectively facing the first pair of sidewalls and attached to the magnet assembly at the second pair of sidewalls of the magnet assembly on the second side of the magnet assembly. The pair of springs including a second spring shaped as a loop defining an aperture sized to accommodate motion of the magnet assembly along the direction of the coil axis, the second spring being attached to the frame at a second pair of the four stubs respectively facing the second pair of sidewalls and attached to the magnet assembly at the first pair of sidewalls of the magnet assembly on the first side of the magnet assembly.

The first side may be referred to as a back side of the magnet assembly.

The second side may be referred to as a front side of the magnet assembly.

The magnet assembly may define the air gap.

The air gap may be a recess defined in the second side of the magnet assembly. The recess may be an annular recess.

By the springs being attached to the magnet assembly on the first side or the second side of the magnet assembly, it is not necessary for the connection point to be at the furthest extent of the magnet assembly at the first side or the second side. Rather, the connection point may be generally at, or around, the respective side. For example, a recess may be provide in the first side or the second side to accommodate part of the spring, meaning that the point of connection is offset slightly (i.e. recessed from) from the outermost part of the magnet assembly at the first side or the second side.

The first spring and/or the second spring may each comprise a single component, or may be formed from a plurality of spring components (e.g. two spring components). As such, the "loop" does not need to be continuous, but may be defined by a combination of spring components.

Implementations of the apparatus can include one or more of the following features.

In some implementations, a width of each spring varies along a circumference of the spring. The width of each spring may be said to vary along a circumference of the spring. This is not intended to require that the spring in circular, by rather that the width is different at different points of the loop. By width, it may be meant a dimension in a direction parallel to a plane perpendicular to the coil axis.

In some implementations, a width of each spring varies along a perimeter of the spring.

The width of each spring can be a local maximum at a location of the spring where the spring attaches to the frame. The width of each spring can be a local maximum at a location of the spring where the spring attaches to the magnet assembly.

In some implementations, the spring includes a pair of first segments on opposing sides of the corresponding aperture, the pair of first segments extending parallel to each other, and each spring further including a pair of second segments on opposing sides of the corresponding aperture, the pair of second segments extending perpendicular to the pair of first segments. The pair of first segments can each extend along a corresponding straight line and have a maximum width at a midpoint of the segment. Each spring can be attached to the frame at the midpoint of the pair of first segments.

An area of attachment of each spring to the frame can extend 0.8 mm or more (e.g., 1 mm or more, 1.2 mm or more, 1.3 mm or more, 1.4 mm or more, 1.5 mm or more, 1.6 mm or more, 1.7 mm or more, 1.8 mm or more, 1.9 mm or more, 2 mm or more, 2.1 mm or more, 2.2 mm or more, 2.5 mm or more, 3 mm or less) along the straight line of the corresponding first segment. An area of attachment of each spring to the frame can extend 0.45 mm or more (e.g., 0.5 mm or more, 0.55 mm or more, 0.6 mm or more, 0.7 mm or more, 0.8 mm or more, 0.9 mm or more, 1 mm or less 0.2 mm or more (0.3 mm or more, 0.4 mm or more, 0.5 mm or more, 0.6 mm or more, 0.7 mm or more, 0.8 mm or more, 0.9 mm or more, 1 mm or less) along a direction perpendicular to the straight line of the corresponding first segment.

The pair of second segments can each including a pair of arms extending along a straight line and an indented portion between the arms, the indented portion being offset from the straight line towards the aperture of the corresponding spring. Each spring can be attached to the magnet assembly at the indented portions of the second segments. In some implementations, the indented portions are each at a midpoint of the corresponding second segments. A width of each second segment can be a maximum at the corresponding indented portion.

In some implementations, the first segments each extend the same length. In some implementations, the second segments each extend the same length. In other implementations, the first and second segments each extend the same length. Each first segment can attach to an adjacent second segment at a corner of the corresponding spring. A width of the spring can be a minimum at the corners of the spring.

In some implementations, each spring has a depth along a direction of the coil axis in a range from 0.1 mm to 0.3 mm (e.g., 0.15 mm or more, 0.16 mm or more, 0.17 mm or more, 0.18 mm or more, e.g., 0.25 mm or less, 0.2 mm or less). Each spring can have a minimum width to depth ratio in a range from 1.1 to 3.75 (e.g., 3.5 or less, 3 or less, 2.5 or less, 2 or less, 1.9 or less, 1.8 or less, 1.7 or less, 1.6 or less, 1.5 or less, e.g., 1.2 or more, 1.3 or more, 1.4 or more).

Each spring can be formed from a single piece of material. Each spring is formed from a metal or alloy. In some implementations, each spring is formed from stainless steel.

The magnet assembly can further include a back plate and sidewalls defining a cup, an inner element including a center magnet mounted within the cup, the back plate extending parallel to the plane, wherein the sidewalls and inner element are separated by the air gap.

Each spring can have a radial dimension that is the sum of (i) the local maximum width of the spring at the location of the spring where the spring attaches to the frame and (ii) a clearance distance between a first point along an edge of the spring facing the aperture at the location of the spring where the spring attaches to the frame and a second point along an edge of the magnet assembly, the clearance distance being measured in a radial direction perpendicular to the coil axis. Each spring can also have an excursion distance that is a maximum distance the spring is displaced in the direction of the coil axis. Each spring can have a radial dimension to excursion distance ratio of 1.5:1 or less (e.g., 1.4:1 or less, 1.3:1 or less; 1.2:1 or less, 1.1:1 or less, 1:1 or more). Where the magnet assembly comprises a back plate, the clearance may be a distance between a first point along an edge of the spring facing the aperture at the location of the spring where the spring attaches to the frame and a second point along an edge of the back plate.

In another aspect, the subject matter features a panel audio loudspeaker including the actuator module and a panel attached to the baseplate of the actuator module. The panel can include a display panel.

In yet another aspect, a mobile device or wearable device includes a housing, the panel audio loudspeaker, and an electronic control module electrically coupled to the voice coil of the actuator module and programmed to energize the voice coil to couple vibrations to the panel to produce an audio response from the panel. The mobile device can be a mobile phone or a tablet computer. The wearable device can be a smart watch or head-mounted display.

Among other advantages, embodiments feature an actuator module that has a decreased chance of failure from mechanical stress caused by the actuator module being dropped, as compared to conventional actuator modules.

Other advantages will be evident from the description, drawings, and claims.

BRIEF DESCRIPTION OF THE DRAWINGS

Like reference symbols in the various drawings indicate like elements.

DETAILED DESCRIPTION

Figure 1:
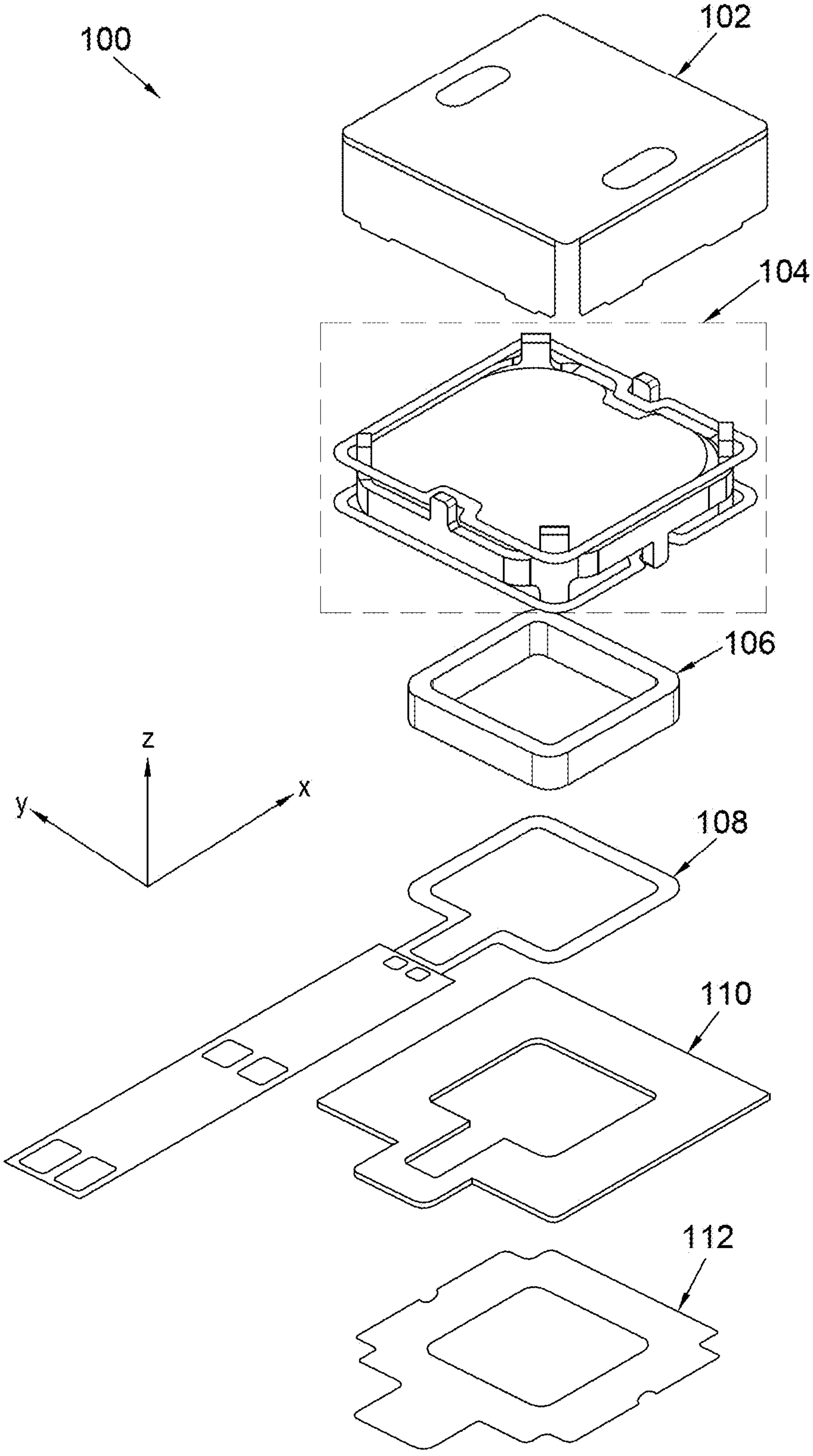
FIG. 1 is a perspective exploded view of an actuator module, which includes a motor module.

Referring to FIG. 1, an actuator module 100 includes a hood 102, a motor module 104, a voice coil 106, and a baseplate 110. A printed circuit board (PCB) 108 is attached to baseplate 110 on one side, and a pressure sensitive adhesive (PSA) 112 is attached on the other side of the baseplate. Hood 102, motor module 104, and voice coil 106 are all connected to baseplate 110, with the hood and the baseplate forming an enclosure that protects the motor module 104 and the voice coil. PSA 112 allows module 100 to be affixed to a panel, such as a flat panel display of a mobile device. A Cartesian coordinate system is shown in FIG. 1 for reference.

Actuator module 100 can be relatively compact. For example, hood 102, which has a substantially square profile in the x-y plane, can have an edge length (i.e., in the x- or y-directions) of about 25 mm or less (e.g., 20 mm or less, 15 mm or less, such as 14 mm, 12 mm, 10 mm or less). The actuator module's height (i.e., its dimension in the z-direction) can be about 10 mm or less (e.g., 8 mm or less, 6 mm or less, 5 mm or less).

During operation, an electric current is applied to voice coil 106 via PCB 108. The resulting magnetic flux interacts with a suspended magnet that is part of motor module 104 (discussed below), which generates a force, i.e., the Lorentz force, that varies proportionally with a change in the current. The force gives rise to vibrations that are transferred via baseplate 110 to the panel.

Figure 2A:
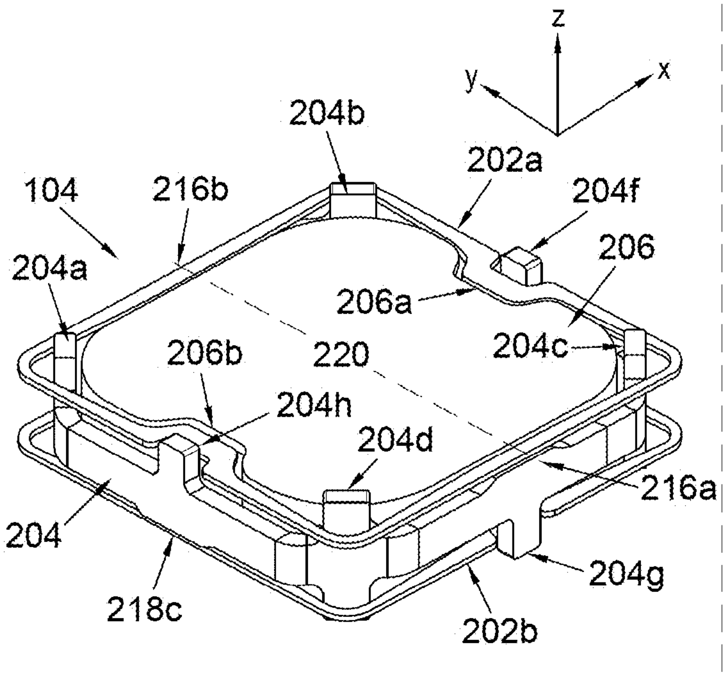
FIG. 2A is an enlarged view of the motor module of FIG. 1, FIG. 2A including two springs attached to a frame.
Figure 2B:
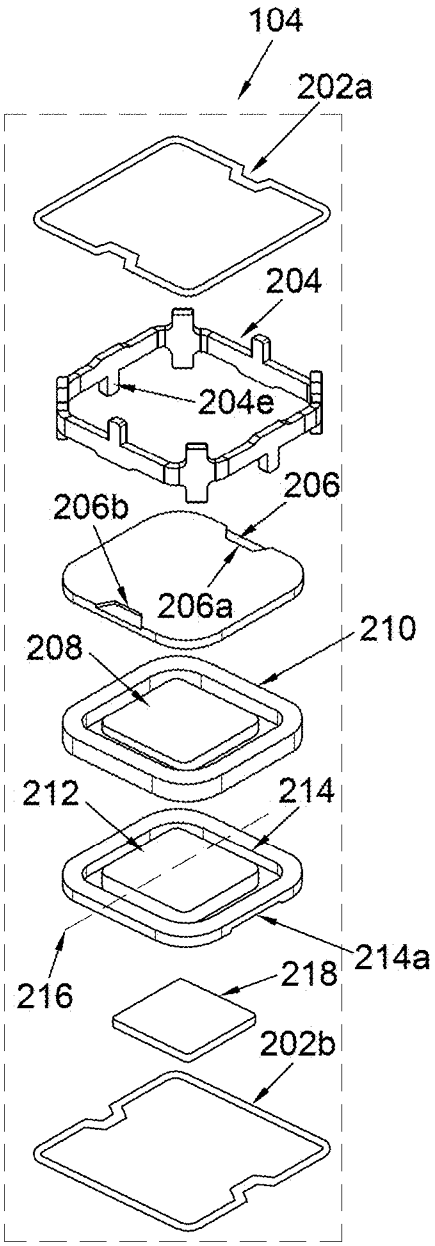
FIG. 2B is an exploded view of the motor module of FIG. 2A.

Referring to FIGS. 2A and 2B, motor module 104 includes a frame 204, a magnet assembly, and a pair of springs 202*a* and 202*b* that suspends the magnet assembly from the frame. The magnet assembly includes a back plate 206 to which a center magnet 208 and a ring magnet 210 are attached. Back plate 206 and ring magnet 210 can make up a magnetic cup, having sidewalls defined by the inside edge of the ring magnet. Center magnet 208 and ring magnet 210 are sized and shaped so that the center magnet fits within a gap defined by the ring magnet, as shown by their relative placement in FIG. 2B. The gap between center magnet 208 and ring magnet 210 can be about 1.2 mm or less (e.g., 1.15 mm or less, 1.1 mm or less, 1.05 mm or less, 1 mm or less). The gap may be referred to as an air gap. The air gap may alternatively be referred to as a recess defined by the components of the magnet assembly. The recess may be an annular recess, as can be seen in FIG. 2B, when considering the space provided between center magnet 208 and ring magnet 210. By "annular" in is not intended to mean circular, but rather a loop-like shape which extends around the center magnet 208, and which is enclosed in the xy-plane by the ring magnet 210.

The magnet assembly also includes a front center plate 212 and a front ring plate 214, which are attached to bottom surfaces of center magnet 208 and ring magnet 210, respectively. The magnet assembly further includes a bucking magnet 218, which is attached to front center plate 212. Front center plate 212 and front ring plate 214 are sized and shaped so that the front center plate fits within a gap defined by the front ring plate, as shown by their relative placement in FIG. 2B. The air gap defined by the ring magnet 210 and the center magnet 208 may also extend between the front center plate 212 and front ring plate 214. Front center plate 212 and front ring plate 214 can be soft magnetic materials, e.g., ones having a high relative permeability. For example, the soft magnetic material may have a relative permeability of about 100 or more (e.g., about 1,000 or more, about 10,000 or more). Examples include high carbon steel and vanadium permendur. In some embodiments, the soft magnetic material can be a corrosion resisting high permeability alloy such as a ferritic stainless steel.

At each corner of frame 204 are posts 204*a*-204*d* that attach the frame to hood 102 and baseplate 110. That is, top surfaces of posts 204*a*-204*d* are attached to hood 102, while bottom surfaces of the posts are attached to baseplate 110. Frame 204 also includes stubs 204*e*-204*h*, which are positioned on the sides of the frame, between two of posts 204*a*-204*d*. Stubs 204*e* and 204*g* each have a bottom surface that attaches to baseplate 110. Stubs 204*f* and 204*h* each have a top surface that attaches to hood 102. Stubs 204*e* and 204*g* are provided on opposite sides of the frame 204 from one another, while stubs 204*f* and 204*h* are also provided on opposite sides of the frame 204 from one another.

While frame 204 has an approximately square shape when viewed in the xy-plane, each corner of the frame is curved so that the frame has dull corners. Between each of the corners of frame 204 are portions of the frame that are substantially straight along their outside edges. The straight portions of frame 204 attach the frame to hood 102. Stubs 204*e*-204*h* extend in the z-direction allowing for an increased area of contact with hood 102, as compared to a frame that does not include the stubs.

While the straight portions of frame 204 attach to hood 102, the outside edge of springs 202*a* and 202*b* do not contact hood 102. That is, a first distance measured between the inside edge of hood 102 and the outside edge of spring 202*a* or 202*b* is greater than a second distance measured between the inside edge of hood 102 and the outside edge of the straight portions of frame 204, where the first and second distances are measured parallel to the x or y-axes.

Spring 202*a* is attached (e.g., welded) to frame 204 at connection points 216*a* and 216*b*. Spring 202*b* is attached to frame 204 at a connection point 218*c*. While obscured in the view of FIG. 2B, spring 202*b* is attached to frame 204 at an additional connection point that is symmetric to connection point 218*c* about an axis 220 that runs parallel to the y-axis.

Springs 202*a* and 202*b* share approximately the same shape when viewed in the xy-plane. The corners of springs 202*a* and 202*b*, as viewed in the xy-plane, are curved. Two sides of springs 202*a* and 202*b*, between the corners of the springs, are substantially straight. The remaining two sides of springs 202*a* and 202*b* are curved inward in a "c" shape. One example of the benefit provided by the c-shaped portions of springs 202*a* and 202*b* is that they allow stubs 204*e*-204*h* to extend in the z-direction.

Spring 202*a* is attached to back plate 206 at connection points 206*a* and 206*b*. Back plate 206 includes two slots at the locations of connection points 206*a* and 206*b*, so that spring 202*a* is significantly flush with the top surface of the back plate. That is, the depth of the slots in the z-direction maybe approximately equal to the thickness of the spring 202*a* at the connection points 206*a*, 206*b*. The shape of the slots of back plate 206 are curved in approximately the same c-shaped curvature as are springs 202*a* and 202*b*. The c-shaped portions of spring 202*a* and the corresponding c-shaped slot of back plate 206 facilitate the connection between these components at connection points 206*a* and 206*b*.

A width of each spring 202*a* and 202*b* varies along a length of the spring. For example, a first width of spring

202*a* at connection point 216*a* or 216*b* is greater than a second width of the spring at the corners of the spring. The first width can be about 0.8 mm or less (e.g., 0.75 mm or less, 0.7 mm or less, 0.65 mm or less), while the second width can be about 0.35 mm or less (e.g., 0.3 mm or less, 0.25 mm or less, 0.2 mm or less). Similarly, a third width of spring 202*a* at connection points 206*a* or 206*b* is greater than the second width of the spring. The third width can be about 0.55 mm or less (e.g., 0.5 mm or less, 0.45 mm or less, 0.4 mm or less). The width of the spring decreases as it extends along any midpoint that is on the spring and between two corners of the spring to any corner of the spring. That is, as spring 202*a* extends from connection point 206*a* or 206*b* to a closest corner of the spring, the width of the spring decreases. Similarly, as spring 202*a* extends from connection point 216*a* or 216*b* to a closest corner of the spring, the width of the spring decreases.

While spring 202*a* is attached to back plate 206, spring 202*b* is attached to a bottom surface of front ring plate 214. FIG. 2B shows where spring 202*b* is attached to front ring plate 214 at a connection point 214*a*. While obscured in the view of FIG. 2, spring 202*b* is attached to front ring plate 214 at a connection point 214*b*, which is symmetric about an axis 216 that runs parallel to the x-axis. Just as back plate 206 includes c-shaped slots at the locations of connection points 216*a* and 216*b*, front ring plate 214 also includes corresponding c-shaped slots at the locations (i.e. connection points 214*a* and 214*b*) where spring 202*b* connects to the front ring plate.

During the operation of actuator module 100, springs 202*a* and 202*b* bend in the z-direction. By virtue of their connection to springs 202*a* and 202*b*, back plate 206, center magnet 208, ring magnet 210, front center plate 212, front ring plate 214, and bucking magnet 218 also move in the z-direction. The locations of the connections of springs 202*a* and 202*b* to motor module 104 are chosen so that the motor module has a desired resonant frequency.

Spring 202*b* includes c-shaped notches that correspond with connection point 214*a* and connection point 214*b* (not shown). The location of connection points 206*a* and 206*b* of back plate 206 and connection points 214*a* and 214*b* of front ring plate 214 can be chosen to facilitate motor module 104 to exhibit a desired resonant behavior. For example, connection points 206*a* and 206*b* are not placed above connection points 214*a* and 214*b*. This placement of the connection points facilitates motor module 104 to exhibit a desired resonant behavior, e.g., to facilitate the motor module to exhibit a desired rocking mode at a particular rocking frequency.

The top surface of back plate 206 (i.e., the surface having rectangular dimensions with rounded corners visible with respect to FIG. 2A) is perpendicular to the z-axis when motor module 104 is at rest. When motor module 104 exhibits a rocking frequency, the moving components of the module undergo rotational motion. For example, referring to FIG. 2A, when motor module 104 is excited at a rocking frequency, the moving components of the module can rotate about axis 220. The degree of rotation, as measured from the rest position, can be approximately 5 degrees or less (e.g., 4 degrees or less, 3 degrees or less, 2 degrees or less, 1 degree or less).

For example, if actuator module 100 is dropped, springs 202*a* and 202*b* and their corresponding connection points can facilitate motor module 104, e.g., the magnet assembly of the motor module, to exhibit a rocking mode. The frequency of the rocking mode can be at roughly twice a resonant frequency displayed by motor module 104. Because the rocking mode is at roughly twice the resonant frequency of motor module 104, it is not a favorable excitation for the motor module during normal operation. However, because the rocking mode is the first normal mode above the resonant frequency, motor module 104 can exhibit the rocking mode if actuator module 100 is dropped, and the force of the impact can be at least partially dissipated by the rocking mode.

The size and shape of the springs, e.g., the width to depth ratio of the springs, is chosen to favor displacement of motor module 104 in the z-direction over displacement of the motor module in the x or y-directions. However, during abnormal operation of actuator module 100, such as when the actuator is dropped, there may be some lateral displacement (e.g., displacement in the x or y-directions) of motor module 104. The lateral displacement causes uneven forces in the z-direction, causing the rocking mode which dissipates the energy of the drop over time.

Not only can the placement of the connection points 216*a*, 216*b*, 214*a*, and 214*b* be chosen to facilitate a desired resonant behavior of motor module 104, the shape of springs 202*a* and 202*b* can affect the resonant behavior of the motor module. For example, the depth of springs 202*a* and 202*b*, as measured in the z-direction, or the width of the springs, as measured in the x and y-directions, can be increased or decreased to promote a desired resonant behavior of motor module 104, e.g., to promote a certain fundamental frequency. In addition, the depth of frame 204 or the width of the frame can be increased or decreased to promote a desired resonant behavior of motor module 104.

The overall dimensions of springs 202*a* and 202*b*, as measured in the x and y-dimensions, can be approximately equal. For example, springs 202*a* and 202*b* can fit within a square having side lengths of about 13.5 mm or less (e.g., 13.25 mm or less, 13 mm or less, 12.75 mm or less, 12.5 mm or less). Springs 202*a* and 202*b* can be made from a hard metal or alloy having a high yield strength, e.g., a yield strength of 1400 MPa or greater. For example, springs 202*a* and 202*b* can be made from stainless steel, e.g., one having a high-cycle fatigue strength, such as 50% cold-worked 301 stainless steel. Springs 202*a* and 202*b* are formed from a single piece of material, although in some implementations, the springs can be formed from multiple pieces of material or multiple pieces of different materials that are adhered together (e.g., using an adhesive or weld).

When motor module 104, including one or more springs of the module, is part of a mobile device, e.g., a mobile phone, it is advantageous to minimize the size of the motor module so that it can fit within a device chassis that may house other components of the mobile device. For example, when an actuator module that includes the motor module is used to drive a panel audio loudspeaker of a mobile device, during operation of the actuator, the spring is displaced in the z-direction, e.g., to provide a force to the panel audio loudspeaker. Achieving a desirable amount of spring displacement, or excursion, using conventional suspension components, e.g., a conventional spider component, may result in a speaker that does not fit within the size constraints of a mobile device. A conventional spider component may have a radial dimension, to excursion ratio of 10:1, where the radial dimension is measured from a central axis to an outer edge of the component. The shape of the springs of motor module 104 are chosen so as to achieve the desired displaced in the z-direction while minimizing the radial dimension of the spring, where the radial dimension is the sum of the maximum width of the spring plus the clearance of the spring. For example, springs 202*a* and 202*b* have a radial dimension of approximately 0.75 mm and an excursion of approximately 0.5 mm, leading to a 1.5:1 radial dimension to excursion ratio. In some implementations, the radial dimension to excursion ratio can be less than 1.5:1 (e.g., 1.4:1 or less, 1.3:1 or less, 1.2:1 or less, 1.1:1 or less).

During operation of the actuator module, moving components of the motor module 104 (e.g., back plate 206, center magnet 208, ring magnet 210, front center plate 212, front ring plate 214, and bucking magnet 218) are displaced in the z-direction. The springs to which the moving components are attached have a frequency response that includes a fundamental frequency, a rocking frequency, and a shearing frequency that are functions of the mass of the moving components, the spring constant of the springs, the width of the springs, as measured in the x or y-directions, and the depth of the springs, as measured in the z-direction. The fundamental frequency of the spring can be on the order of 280 Hz or less (e.g., 270 Hz or less, 260 Hz or less, 250 Hz or less, 240 Hz or less, 230 Hz or less).

When the springs exhibit a shearing frequency, the moving components of the module are displaced in the x and/or y-directions. The displacement in the x and/or y-directions can be on the order of 0.2 mm or less (e.g., 0.15 mm or less, 0.1 mm or less, 0.05 mm or less, 0.025 mm or less). The shearing frequency can be many times the fundamental frequency. For example, the shearing frequency of the motor module can be on the order of 1150 Hz or less (e.g., 1100 Hz or less, 1050 Hz or less, 1000 Hz or less, 950 Hz or less, 900 Hz or less).

Figure 3A:
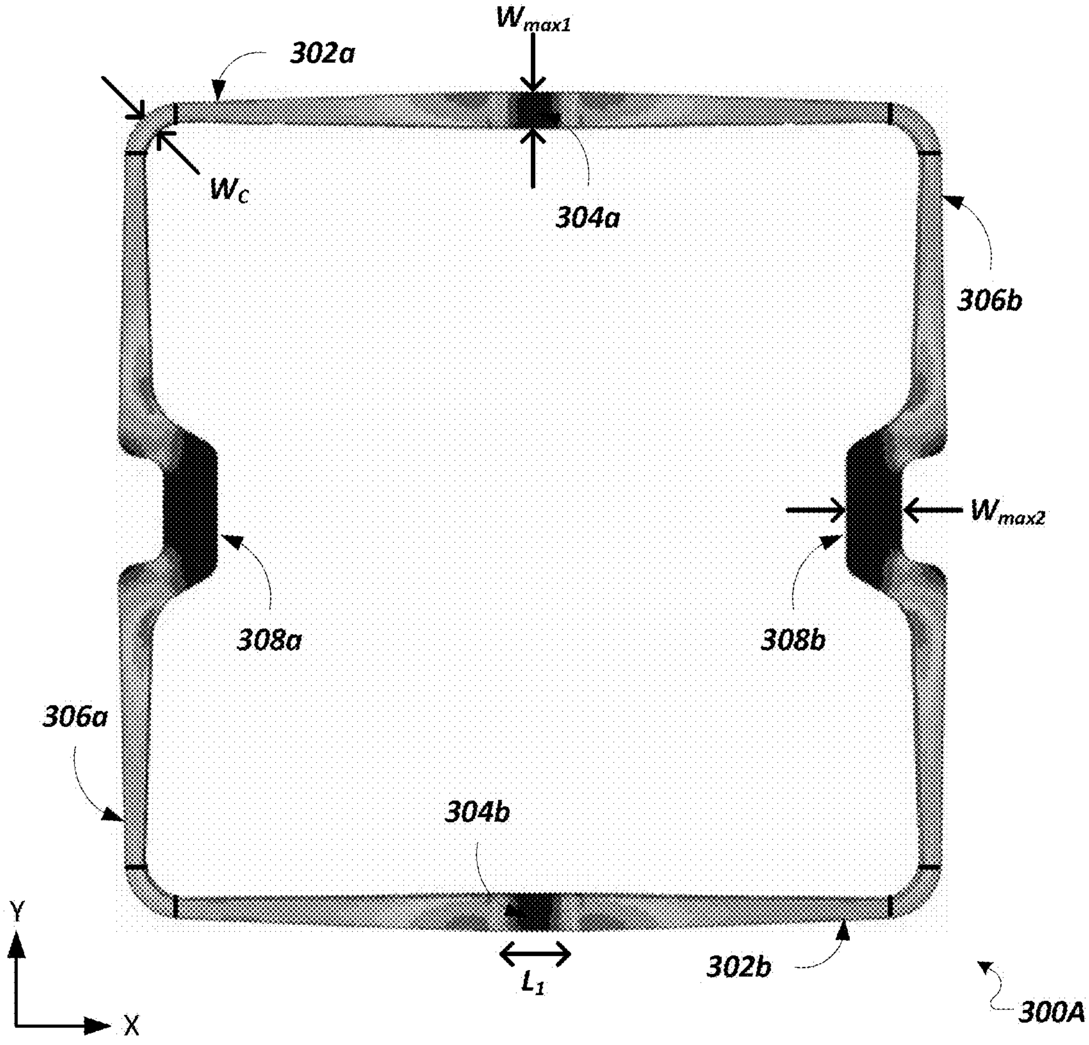
FIG. 3A is a top view of a spring that can be substituted for one or both of the springs of the motor module of FIGS. 2A-2B.

While FIGS. 2A and 2B show one particular embodiment of springs 202*a* and 202*b*, other embodiments are possible. For example, FIG. 3A is a top view of a spring 300A, which can be substituted for spring 202*a*, 202*b*, or both.

Spring 300A has a pair of segments 302*a* and 302*b* that extend the same distance in the x-direction and are bordered at their ends by solid black lines. Segments 302*a* and 302*b* include connection points 304*a* and 304*b*, respectively, which are positioned at the midpoint of each segment. Connection points 304*a* and 304*b* are finite areas of spring 300A at which the spring is attached to areas of frame 204. Spring 300A also includes a pair of segments 306*a* and 306*b* that extend the same distance in the y-direction and are bordered at their ends by solid black lines. Segments 306*a* and 306*b* include connection points 308*a* and 308*b*, respectively, which are positioned at the midpoint of each segment, at an indented portion of the segment.

Connection points 308*a* and 308*b* are finite areas of spring 300A at which the spring is attached to either areas of back plate 206 or areas of front ring plate 214, depending on the position of the spring relative to the magnets of motor module 104. For example, if spring 300A is positioned above center magnet 208, i.e., like spring 202*a*, then spring 300A is attached to back plate 206 at connection points 206*a* and 206*b*. If instead spring 300A is positioned below center magnet 208, i.e., like spring 202*b*, then spring 300A is attached to front ring plate 214 at connection points 214*a* and 214*b*.

In some implementations, spring 300A is welded to components of motor module 104 at the connection points 304*a*, 304*b*, 308*a*, and 308*b*. When spring 300A is welded, the connection points and their surrounding areas may be more fragile than other portions of the spring that are farther from the weld site. Accordingly, it is advantageous to distribute the stress on spring 300A so that there is relatively low stress at and near the connection points.

Segments 302*a*, 302*b*, 306*a* and 306*b* are each connected to rounded corners. The shape and width of the corners helps to evenly distribute the stress experienced during operation of the actuator module along the corner and along each segment of spring 300A. Spring 300A has a minimum width, $W_c$, at the corners of the spring. The minimum width refers to the minimum dimension measured in the xy-plane, e.g., along the radius of curvature of each corner. $W_c$ is approximately 0.31 mm.

The shape and width, as measured in the y-direction, of segments 302*a* and 302*b* are chosen to distribute stress along the length of the segment. The width of segments 302*a* and 302*b* increases from a width at the boundaries of each segment and the adjacent corners, to a local maximum, $W_{max1}$, at connection points 304*a* and 304*b*, respectively. The width $W_{max1}$ is approximately 0.55 mm. The shape and dimensions of spring 300A promote a certain frequency response of the spring. Spring 300A has a fundamental frequency of 255 Hz, a rocking frequency of 520 Hz, and a shearing frequency of 990 Hz.

While the width, as measured in the y-direction, of segments 302*a* and 302*b* increases along a portion of the segments, the width, as measured in the x-direction, of segments 306*a* and 306*b*, also increases along a portion of the segments to distribute stress along the length of the segments. The width of segments 306*a* and 306*b* increases from a width at the boundaries of each segment and the adjacent corners, to a local maximum, $W_{max2}$, at connection points 308*a* and 308*b*, respectively. The width $W_{max2}$ is approximately 0.83 mm.

The area of attachment between spring 300A and frame 204 also affects the frequency response of the spring. Increasing the area of attachment decreases the length of spring 300A that is free to vibrate, which in turn changes the distribution of force along the spring. The area of attachment is dictated by the width of the spring and the length of connection points 304*a* and 304*b*, which is labeled $L_1$ in FIG. 3A. The length $L_1$ is approximately 2.03 mm. The area of attachment is approximately 1.117 $mm^2$ (2.03 mm×0.55 mm). The area of attachment between spring 300A and frame 204 is rectangular, although in general, the area of attachment between the spring and the frame can be other shapes that allow the spring to adhere to the frame, e.g., rectangular with rounded edges, circular, oval.

Not only does the width of spring 300A affect the distribution of stress along the spring, so too does the depth of the spring, as measured in the z-direction. The depth of spring 300A is approximately 0.1778 mm. The behavior and stress resistance of spring 300A changes according to the width to depth ratio of spring 300A. The width to depth ratio of a spring is the ratio of the width at connection point 304*a* or 304*b*, i.e., $W_{max1}$, to the depth of the spring. A positive width to depth ratio (i.e. a width to depth ratio greater than 1) favors motion of the moving components of motor module 104 in the z-direction, as opposed to the x and/or y-directions. Spring 300A has a width to depth ratio of 1.65.

The physical dimensions of spring 300A can be increased or decreased to promote a certain change in the frequency response of the spring. For example, increasing the width or the depth of the spring results in increases in the fundamental frequency, rocking frequency, and shearing frequency of the spring. In particular, increasing the corner width results in increases in the fundamental frequency, rocking frequency, and shearing frequency. Increasing the corner width also results in an increase in the stress experienced by the spring at and around the area of attachment of the spring. Increasing the area of attachment between the spring and the frame increases the fundamental frequency, rocking frequency, and shearing frequency of the spring.

FIGS. 3B-3E are examples of the effects of changing the physical dimensions of the spring. FIGS. 3B-3E show different springs, each one of which, like spring 300A, can be substituted for spring 202*a*, 202*b*, or both. It is also possible to have a motor module that includes two different spring designs.

Figure 3C:
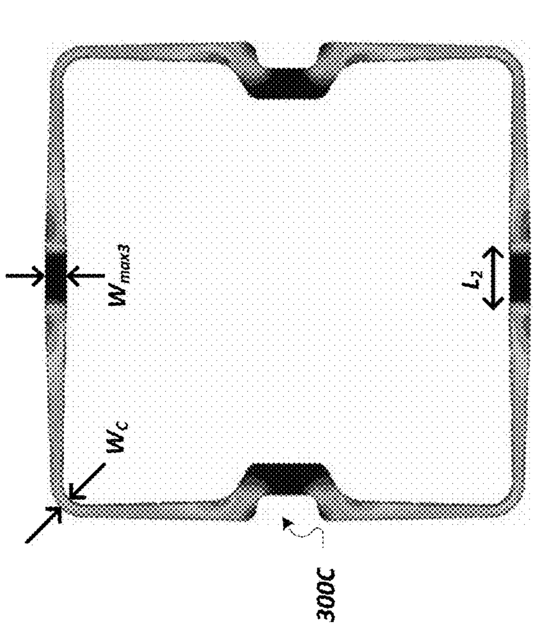
FIG. 3C is a top view of a spring that can be substituted for one or both of the springs of the motor module of FIGS. 2A-2B, the spring of FIG. 3C having a decreased depth compared to the depth of the springs of FIGS. 3A-3B.
Figure 3E:
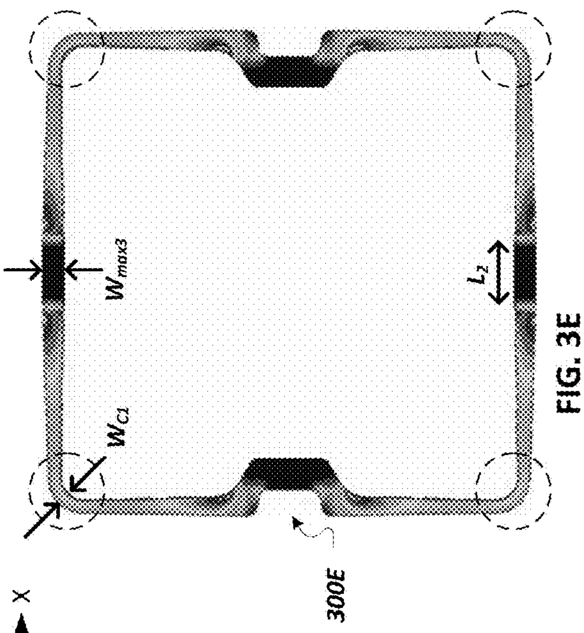
FIG. 3E is a top view of a spring that can be substituted for one or both of the springs of the motor module of FIGS. 2A-2B, the spring of FIG. 3E having an increased width at the corners of the spring, compared to the corner widths of the springs of FIGS. 3A-3D.
Figure 3B:
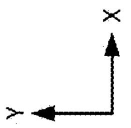
FIG. 3B is a top view of a spring that can be substituted for one or both of the springs of the motor module of FIGS. 2A-2B, the spring of FIG. 3B having an increased area of attachment to the frame of FIGS. 2A-2B compared to an area of attachment of the spring of FIG. 3A to the frame.
Figure 3B:
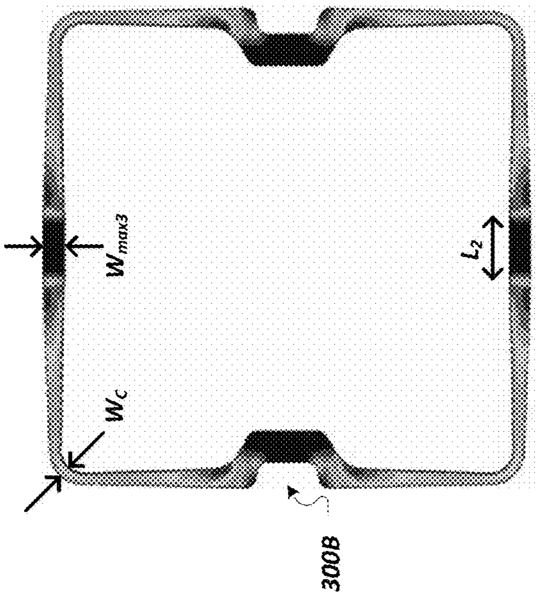

FIG. 3B shows another example of a spring 300B. Although not shown with regard to FIG. 3B, when spring 300B is connected to frame 204, an area of attachment between the spring and the frame is greater than the area of attachment between spring 300A and frame 204. Respectively, the width and length of the area of attachment is approximately 0.6 mm, labeled $W_{max3}$, and approximately 2 mm, labeled $L_2$, respectively, which makes the area of attachment of spring 300B approximately 1.2 $mm^2$. The depth of spring 300B is approximately 0.1778, the same as that of spring 300A, which makes the width to depth ratio 3.37. The fundamental frequency, rocking frequency, and shearing frequency of spring 300B is 270 Hz, 560 Hz, and 1060 Hz, respectively.

FIG. 3C shows a further example of a spring 300C having the same area of attachment as spring 300B (i.e., a decreased area of attachment compared to the area of attachment of spring 300A) but a decreased spring depth, as measured in the z-direction, compared to spring 300B (i.e., a decreased spring depth compared to the spring depth of springs 300A and 300B). That is, like spring 300B, the width and length of the area of attachment of spring 300C is 0.6 mm and 2 mm, respectively. The depth of spring 300C is approximately 0.16 mm, which makes the width to depth ratio of 3.75. The fundamental frequency, rocking frequency, and shearing frequency, of spring 300C are 233 Hz, 495 Hz, and 1000 Hz, respectively.

Figure 3D:
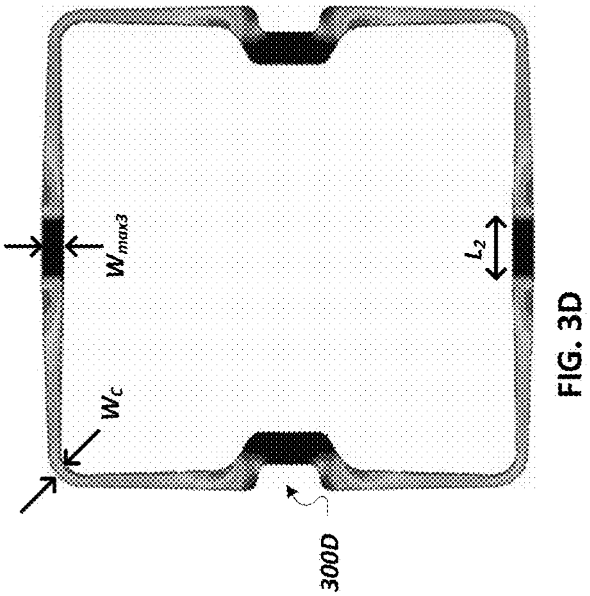
FIG. 3D is a top view of a spring that can be substituted for one or both of the springs of the motor module of FIGS. 2A-2B, the spring of FIG. 3D having a decreased depth compared to the depth of the spring of FIG. 3C.
Figure 3F:
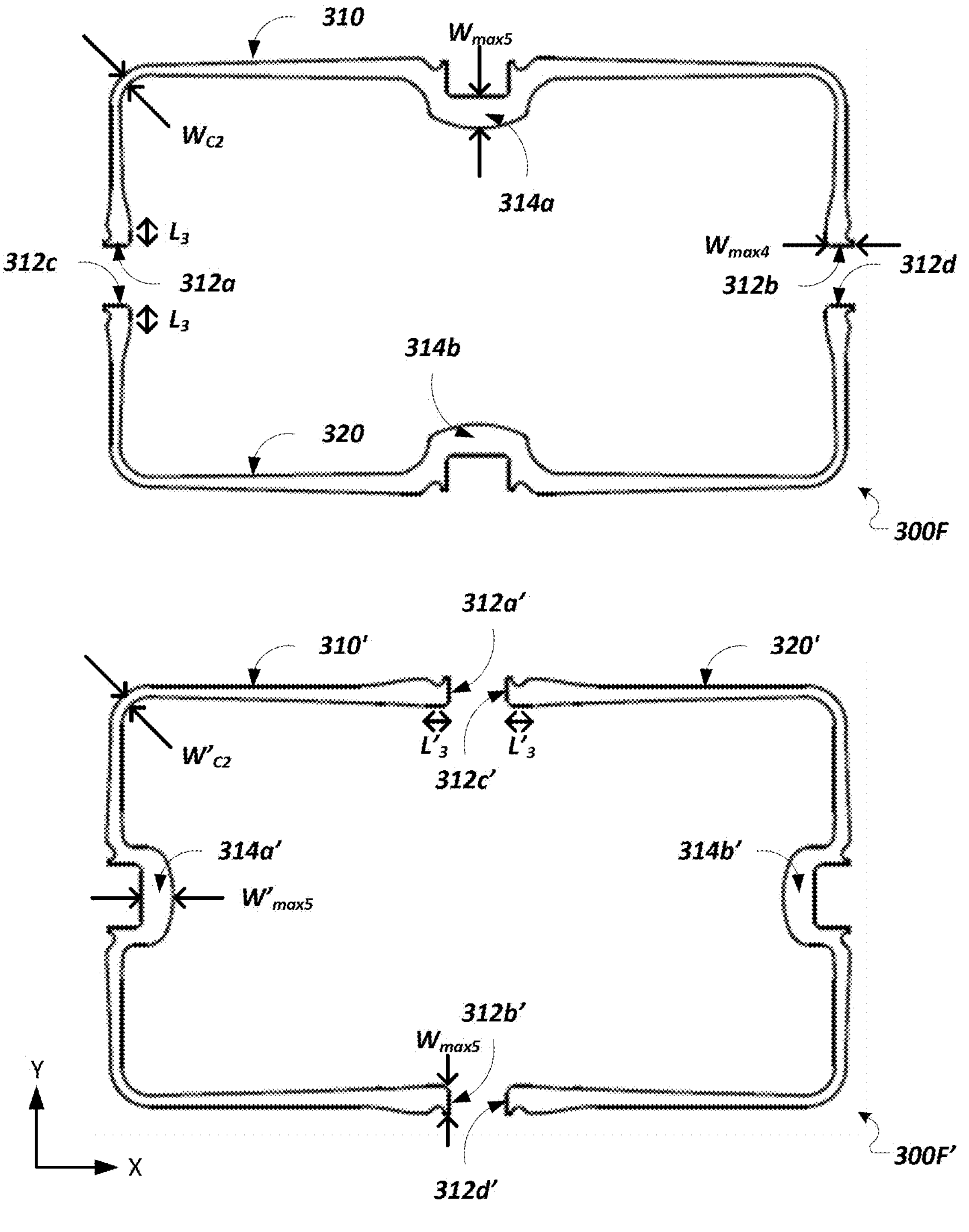
FIG. 3F is a top view of a pair of springs that can be substituted for the springs of the motor module, each spring of the pairs of springs of FIG. 3F having multiple components.

FIG. 3D shows another example of a spring 300D having the same area of attachment as springs 300B and 300C (i.e., an increased area of attachment compared to the area of attachment of spring 300A) but a decreased spring depth, compared to the spring depth of springs 300A and 300B. The spring depth of spring 300D is approximately 0.165 mm, which makes the width to depth ratio 3.63. The fundamental frequency, rocking frequency, and shearing frequency of spring 300D are 238 Hz, 516 Hz, and 1086 Hz, respectively. Comparing springs 300B with spring 300D, decreasing the spring depth results in decreases in the fundamental frequency and rocking frequency. However, while decreasing the spring depth from a first depth (that of spring 300B) to a second depth (that of spring 300C) results in a decrease in the shearing frequency, a spring depth between the first depth and the second depth (that of spring 300D) results in an increase in the shearing frequency.

FIG. 3E shows yet another example of a spring 300E having the same area of attachment as springs 300B-300D (i.e., an increased area of attachment compared to the area of attachment of spring 300A) and the same depth as spring 300D, but an increased width at the corners of the spring, compared to the corner widths of springs 300A-300D. The width to depth ratio of spring 300E is 2.16. The increased corner widths of spring 300E are emphasized by dashed lines. The corner widths of spring 300E are labeled $W_{c1}$. $W_{c1}$ is approximately 0.29 mm. The fundamental frequency, rocking frequency, and shearing frequency of spring 300E are 240 Hz, 506 Hz, and 1010 Hz, respectively.

While FIGS. 2A-3E illustrate springs having a substantially square footprint (i.e., in the x-y plane) other shapes are possible, such as substantially rectangular, oval, or round. While FIGS. 2A-3E illustrate springs that are a single piece, multi-piece spring designs are also possible. FIG. 3F shows a further example of a spring 300F and 300F', each having a substantially rectangular footprint and each including two pieces. Spring 300F and 300F' can be substituted for springs 202*a* and 202*b*, respectively, or for springs 202*b* and 202*a*, respectively. Spring 300F includes pieces 310 and 320. Spring 300F' includes pieces 310' and 320'.

Spring 300F includes connection points 312*a*, 312*b*, 312*c*, and 312*d*. Connection points 312*a*-312*d* are finite areas of spring 300F at which the spring is attached to areas of frame 204. Connection points 312*a* and 312*b* are positioned at the ends of piece 310, while connection points 312*c* and 312*d* are positioned at the ends of piece 320. Spring 300F also includes connection points 314*a* and 314*b*, which are finite areas of the spring at which it is attached to either areas of back plate 206 or to areas of front ring plate 214, depending on the position of the spring relative to the magnets of motor module 104. The length of the portion of spring 300F that is connected to frame 204 at connection points 312*a*-312*d* is labeled $L_3$. $L_3$ is approximately 0.5 mm.

Spring 300F' includes connection points 312*a*', 312*b*', 312*c*', and 312*d*'. Connection points 312*a*'-312*d*' are finite areas of spring 300F' at which the spring is attached to areas of frame 204. Connection points 312*a*' and 312*b*' are positioned at the ends of piece 310', while connection points 312*c*' and 312*d*' are positioned at the ends of piece 320'. Spring 300F' also includes connection points 314*a*' and 314*b*', which are finite areas of the spring at which it is attached to either areas of back plate 206 or to areas of front ring plate 214, depending on the position of the spring relative to the magnets of motor module 104. The length of the portion of spring 300F' that is connected to frame 204 at connection points 312*a*'-312*d*' is labeled $L'_3$.

Spring 300F has a first local maximum width, $W_{max4}$, at connection points 312*a*-312*d* and a second local maximum width, $W_{max5}$, at connection points 314*a* and 314*b*. $W_{max4}$ and $W_{max5}$ are approximately 0.6 mm and 0.7 mm, respectively. The width of spring 300F tapers along a portion of the spring from the first local maximum width to a corner of the spring. The width at the corner of spring 300F, $W_{c2}$, is a local minimum width of the spring 300F. $W_{c2}$ is approximately 0.22 mm. The width of spring 300F also tapers along a portion of the spring from the second local maximum width to the corner of the spring.

Spring 300F' has a first local maximum width, $W'_{max4}$, at connection points 312*a*'-312*d*' and a second local maximum width, $W'_{max5}$, at connection points 314*a*' and 314*b*'. The width of spring 300F' tapers along a portion of the spring from the first local maximum width to a corner of the spring. The width at the corner of spring 300F', $W'_{c2}$, is a local minimum width of the spring 300F'. The width of spring 300F' also tapers along a portion of the spring from the second local maximum width to the corner of the spring.

Referring now to springs 300A-300F and 300F', the springs can be sized and shaped according to the following specifications. For example, the maximum width along the portion of the spring that connects to frame 204 can be 0.2 mm or more (0.3 mm or more, 0.4 mm or more, 0.5 mm or more, 0.6 mm or more, 0.7 mm or more, 0.8 mm or more, 0.9 mm or more, 1 mm or less). The maximum width along the portion of the spring that connects to either back plate 206 or front plate 214 can be 0.3 mm or more (0.4 mm or more, 0.5 mm or more, 0.6 mm or more, 0.7 mm or more, 0.8 mm or more, 0.9 mm or more, 1 mm or less). The width at the corner of the springs can be 0.35 mm or less (e.g., 0.3 mm or less, 0.275 mm or less, 0.25 mm or less, 0.225 or less, 0.2 mm or less).

The spring depth ranges from approximately 0.1 mm to approximately 0.3 mm (e.g., 0.15 mm or more, 0.16 mm or more, 0.17 mm or more, 0.18 mm or more, e.g., 0.25 mm or less, 0.2 mm or less). The springs have a minimum width to depth ratio in a range from 1.1 to 3.75 (e.g., 3.5 or less, 3 or less, 2.5 or less, 2 or less, 1.9 or less, 1.8 or less, 1.7 or less, 1.6 or less, 1.5 or less, e.g., 1.2 or more, 1.3 or more, 1.4 or more). The lateral stiffness of the spring, e.g., as measured in the x and/or y-directions, should be greater than the stiffness of the spring in the z-direction by 2 times or more, (e.g., 4.5 times or more, 5 times or more, 5.5 times or more, 6 times or more).

The length of the connection points that connect springs 300A-300E to frame 204 can be 0.8 mm or more (e.g., 1 mm or more, 1.2 mm or more, 1.3 mm or more, 1.4 mm or more, 1.5 mm or more, 1.6 mm or more, 1.7 mm or more, 1.8 mm or more, 1.9 mm or more, 2 mm or more, 2.1 mm or more, 2.2 mm or more, 2.5 mm or more, 3 mm or less). The length of connection points 312*a*-312*d* and the length of connection points 312*a*'-312*d*' can be 0.4 mm or more (e.g., 0.5 mm or more, 0.6 mm or more, 0.65 mm or more, 0.7 mm or more, 0.75 mm or more, 0.8 mm or more, 0.85 mm or more, 0.9 mm or more, 0.95 mm or more, 1 mm or more, 1.05 mm or more, 1.1 mm or more, 1.25 mm or more, 1.5 mm or less).

Figure 4:
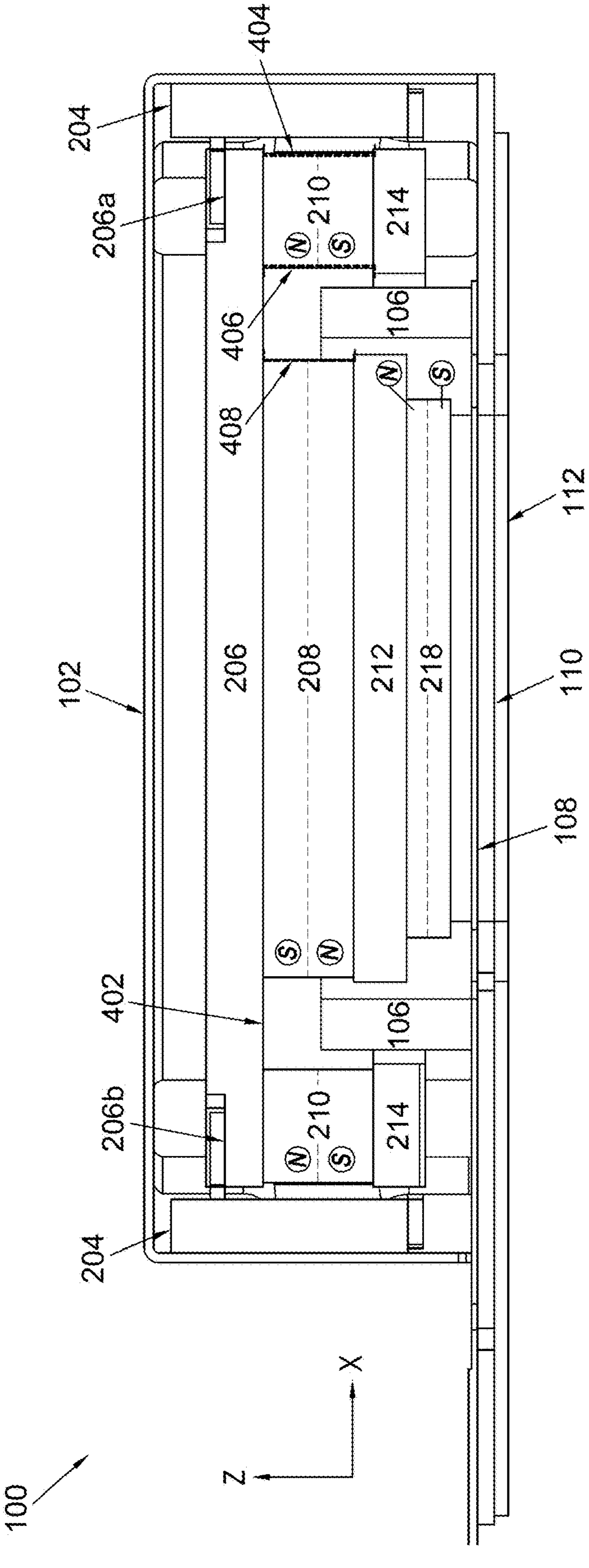
FIG. 4 is a cross-sectional view of the actuator module of FIG. 1.

Referring now to FIG. 4, a cross-sectional view of actuator module 100 shows an air gap 402, which separates center magnet 208 and ring magnet 210, as well as front center plate 212 and front ring plate 214. Voice coil 106 is positioned in air gap 402. Center magnet 208, ring magnet 210, and bucking magnet 218 generate magnetic fields which pass perpendicularly to voice coil 106, i.e., in the x-direction. FIG. 4 also shows the relative polarities of each magnet, shown as "N" and "S." Center magnet 208 and ring magnet 210 have their corresponding magnetic poles aligned in opposite directions.

During the operation of actuator module 100, voice coil 106 is energized. When energized, voice coil 106 induces a magnetic field in air gap 402. Center magnet 208 and ring magnet 210 each experience a force due to the interaction of their magnetic fields with that induced by voice coil 106. The force experienced by center magnet 208 and ring magnet 210 cause these components to be displaced in the z-direction. By virtue of their respective connections, back plate 206, front center plate 212, front ring plate 214, and bucking magnet 218 are displaced in the z-direction during operation of actuator assembly 100.

Bucking magnet 218 is provided to focus the magnetic field generated by center magnet 208 and ring magnet 210, so that the magnetic flux passing though voice coil 106 along the x-axis is maximized. The polarity of bucking magnet 218 is chosen to oppose the magnetic flux of center magnet 208 and ring magnet 210. That is, center magnet 208 and bucking magnet 218 have their corresponding magnetic poles aligned in opposite directions. Bucking magnet 218 can also reduce the stray magnetic flux generated by center magnet 208 and ring magnet 210, e.g., reduce the magnetic flux that does not pass perpendicularly to voice coil 106.

During normal operation of actuator module 100, moving components of the actuator are displaced primarily in the z-direction. Outside of normal operation, the moving components of the module may be displaced in the x or y-directions, e.g., as a result of the module being dropped, or as a result of a mobile device that includes the module being dropped. Displacement in the x or y-directions of the moving components can cause damage to actuator module 100. Accordingly, hood 102 and frame 204 serve as physical stops to prevent significant displacement of the moving components of actuator module 100.

For example, when actuator module 100 is dropped, back plate 206, front ring plate 214, or both may contact frame 204, preventing further displacement of these components in the x or y-directions. Back plate 206 and front ring plate 214 can be made from one or more materials that are able to withstand the shock caused by contacting frame 204. These components are also sized to prevent ring magnet 210 from contacting frame 204, therefore preventing the magnet from being damaged as a result of contacting the frame. For example, a section of the outer surface formed by ring magnet 210 is recessed relative to a section of the outer surface formed by front ring plate 214. Similarly, a section of the output surface formed by ring magnet 210 is recessed relative to a section of the outer surface formed by back plate 206. One of the recessed portions of ring magnet 210 is accented by a white dotted line 404. In other words, a first gap between an inner surface of frame 204 and the outer surface of front ring plate 214 and a second gap between the inner surface of frame 204 and an outer surface of back plate 206 are smaller than a third gap between the inner surface of the frame and the outer surface of ring magnet 210. For example, the difference between the first and third gaps and the second and third gaps can be about 0.05 mm or less (e.g., 0.045 mm or less, 0.04 mm or less, 0.035 mm or less).

Similarly, to protect ring magnet 210, a section of the inner surface formed by the ring magnet is recessed relative to a section of the inner surface of front ring plate 214. One of the recessed portions of ring magnet 210 is accented by a white dotted line 406. In other words, a gap between voice coil 106 and front ring plate 214 is smaller than a gap between the voice coil and ring magnet 210. This relative spacing prevents ring magnet 210 from contacting voice coil 106.

Similarly, to protect center magnet 208, a section of the outer surface formed by the center magnet is recessed relative to a section of the outer surface formed by front center plate 212. One of the recessed portions of center magnet 208 is accented by a white dotted line 408. In other words, a gap between voice coil 106 and front center plate 212 is smaller than a gap between voice coil 106 and center magnet 208. This relative spacing prevents center magnet 208 from contacting voice coil 106.

Figure 5A:
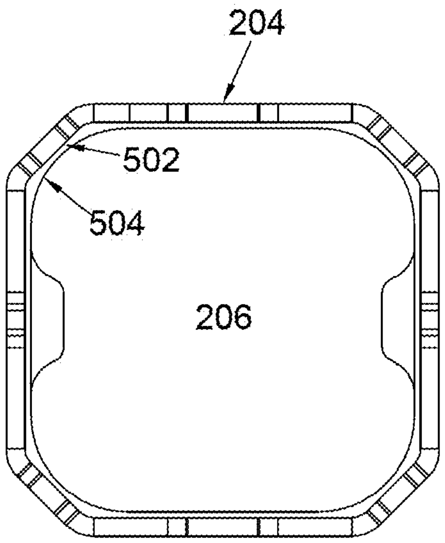
FIG. 5A is a top view of a frame and back plate of the actuator module of FIGS. 1 and 4.

The relative shape of other components of actuator module 100 can be chosen to prevent damage that may be caused by the module being dropped. For example, back plate 206 can be shaped so as to efficiently dissipate the forces generated when actuator module 100 is dropped. FIG. 5A is a top view of frame 204 and back plate 206. FIG. 5A shows how the corners of back plate 206 are shaped to dissipate forces that could otherwise damage components of actuator module 100. For example, the arcs that form the corners of back plate 206 are chosen so the portion of the baseplate that impacts frame 204 is large enough to effectively dissipate the impact force. If back plate 206 or front ring plate 214 make contact with frame 204, hood 102 can prevent the frame from being significantly displaced as a result of the force exerted on it by the back plate or the front ring plate. In some embodiments, the radius of curvature of the inside corner arc of voice coil 106 and the radius of curvature of the outside corner arc of front center plate 212 are approximately the same. In certain embodiments, the radius of curvature of the outside corner arc of voice coil 106 and the radius of curvature of the inside corner arc of front ring plate 214 are approximately the same.

Referring to FIG. 5A, each corner of frame 204 is closest to a corresponding corner of voice coil 106, back plate 206, front center plate 212, and front ring magnet 214. The corners of some or all of voice coil 106, back plate 206, front center plate 212, and front ring magnet 214 are concentric. Concentric corners are corners that form arcs whose circles of best fit are concentric with respect to one another. For example, referring to FIG. 5B, a corner of voice coil 106 is concentric with a corresponding corner of front ring magnet 214. That is, a circle that best fits the arc formed by the corner of voice coil 106 is concentric with a circle that best fits the arc formed by a corresponding corner of front ring magnet 214.

Concentric corners can nest within one another, allowing a greater surface area of contact between the corners, as compared to the surface area of contact between corners that are not concentric. Accordingly, the corresponding corners of voice coil 106, front center plate 212, and front ring magnet 214 are concentric with respect to one another.

Figure 5B:
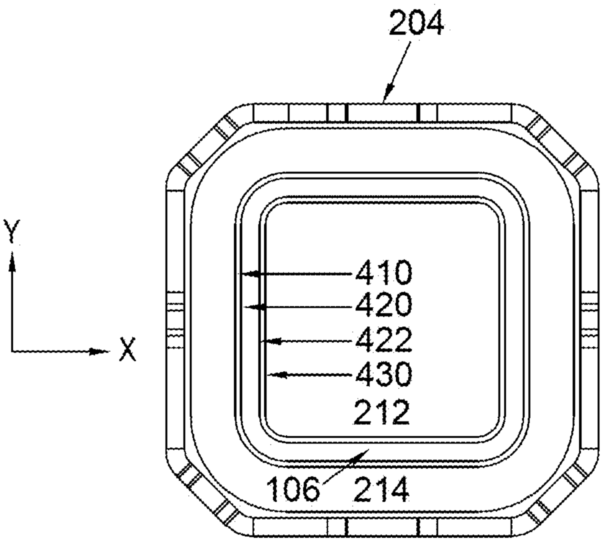
FIG. 5B is a top view of the actuator module of FIGS. 1, 4, and 5A, which includes a voice coil, a front center plate, a front ring plate, and the frame of FIG. 5A.

Similarly, the shapes of the corners of other components of actuator module 100 can be chosen so that the corners that may contact one another when the module is dropped have a large enough surface area to effectively dissipate forces generated during the drop. FIG. 5B is a top view of voice coil 106, frame 204, front center plate 212, and front ring plate 214. The radii of curvature of the corners of front center plate 212 and front ring plate 214 are chosen so as to maximize the contacting surface area between these components and voice coil 106 if actuator module 100 is dropped, thereby distributing any force associated with impact between the two components at the corners over a greater area. The shape of an inner edge 410 of front ring plate 214 is chosen so as to maximize its contact with an outer edge 420 of voice coil 106 if the front ring plate is displaced in the x and/or y-directions, e.g., if actuator module 100 is dropped. The shape of an inner edge 422 of voice coil 106 is chosen so as to maximize its contact with an outer edge 430 of front center plate 212 if the front center plate is displaced in the x and/or y-directions, e.g., if actuator module 100 is dropped.

To further help maximize the contacting surface area between voice coil 106 and front ring plate 214 during displacement in the x and/or y-directions, a distance between the outside corner arc of voice coil 106 and the inside corner arc of front ring plate 214 is larger than a distance between the outside middle edge of the voice coil and the inside middle edge of the front ring plate. Similarly, a distance between the outside corner arc of front center plate 212 and the inside corner arc of voice coil 106 is larger than a distance, between the outside middle edge of the front center plate and the inside middle edge of the voice coil.

In some embodiments, actuator module 100 can include a damping material between all or some of the edges of components that may make contact with one another, e.g., if actuator module 100 is dropped. For example, a damping material can be positioned between an inner edge 502 of frame 204 and an outer edge 504 of back plate 206. In some embodiments, a damping material can be placed between inner edge 410 of front ring plate 214 and outer edge 420 of voice coil 106. In other embodiments, a damping material can be placed between inner edge 422 of voice coil 106 and outer edge 430 of front center plate 212.

In some embodiments, a damping material can be attached to one or more springs of the motor module to form a composite spring. For example, a damping material can be attached above or below the spring, or can be attached both above and below the spring. The damping material can be completely or partially coplanar with one or more surfaces of the spring. In some embodiments, the placement of the damping material can be chosen such that the properties of the spring are different from those of the resulting composite spring. For example, adding a damping material to a spring can form a composite spring having a different stiffness or frequency response (e.g., different fundamental, rocking, and/or shearing frequency) than the spring alone.

In some embodiments, a damping material can be positioned between a top surface of back plate 206 and a bottom surface of hood 102. In other embodiments, a damping material can be positioned between hood 102 and frame 204. The damping material can be any material that is able to reduce the force of impact between components that contact one another. For example, the damping material can be a foam, a pressure sensitive adhesive, a ferrofluid, or a compliant polymer, e.g., one having a low stiffness and high elongation after curing.

Figure 6A:
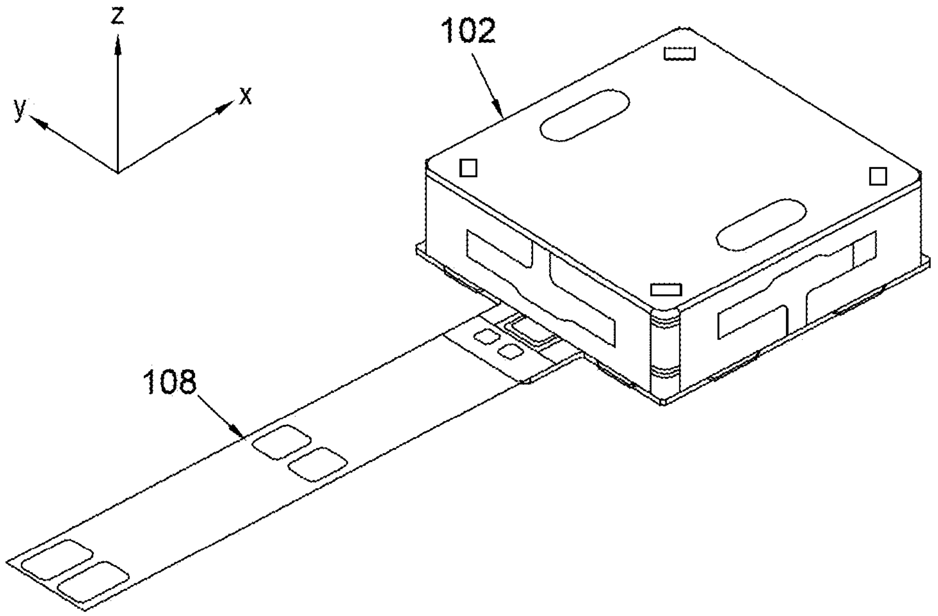
FIG. 6A is a perspective top view of the actuator module of FIGS. 1, 4-5B.
Figure 6B:
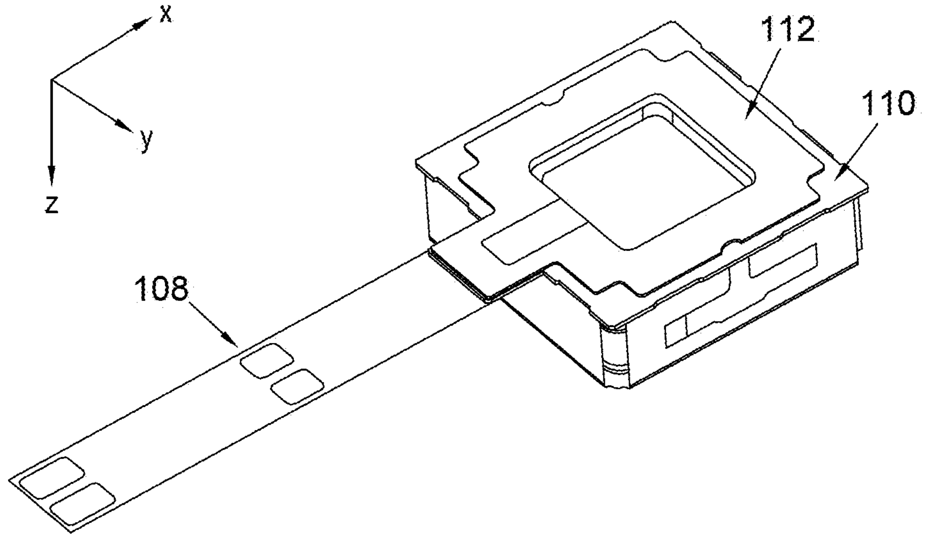
FIG. 6B is a perspective bottom view of the actuator module of FIGS. 1, 4-6A.

The components of actuator module 100 are packaged together, as illustrated in FIGS. 6A and 6B, which are a perspective top view and a perspective bottom view of the actuator module, respectively. Referring to FIG. 6A, PCB 108 is positioned above baseplate 110. PCB 108 is a substrate for electronic components that interface with actuator module 100. For example, PCB 108 can connect to electronic components that control the operation of actuator module 100. PCB 108 can be wholly or partly flexible. PCB 108 extends in the x-direction, e.g., to include a large enough surface area for the electrical components that are printed on its surface. PCB 108 can also include a ring-shaped structure that is housed within and enclosed by hood 102 (as shown in FIG. 1).

In addition to serving as an enclosure for the other components of actuator module 100, hood 102 also provides magnetic shielding. When actuator module 100 is housed in a mobile device, it is advantageous to reduce the magnetic flux present outside of hood 102, e.g., so that other electronic components of the mobile device are not affected by the magnetic fields generated by the magnets and voice coil 106. Accordingly, the material properties of hood 102 are chosen to provide the desired magnetic shielding. For example, the magnetic permeability of the one or more materials chosen for hood 102 should be high enough so that the hood acts as a shield, but not so high that the hood promotes the formation of magnetic fields that may be present as a result of other components housed in the mobile device. For example, the material or materials of hood 102 may have a relative permeability equal to or more than 100, equal to or more than 1000, or equal to or more than 10000. Examples include high carbon steel and vanadium permendur.

While the foregoing figures cover a specific embodiment of an actuator module, i.e., actuator module 100, more generally the principles embodied in this example can be applied in other designs too. For example, while magnet motor 104 has a substantially square footprint (i.e., in the x-y plane), other shapes are possible, such as substantially rectangular, oval, or round.

While actuator module 100 includes three magnets, in some implementations, an actuator module can include one, two, three, or more magnets. For example, while actuator module 100 includes ring magnet 210 and center magnet 208, in some embodiments, an actuator module can include either the ring magnet or the center magnet and one or more bucking magnets. In other embodiments, an actuator module can include either ring magnet 210 or center magnet 208 and no bucking magnet 218.

In some embodiments, an actuator module can include a cup magnet module, e.g., a magnet positioned in a cup made of a permeable material, such as steel. In some embodiments, the cup magnet module can be accompanied by one or more bucking magnets, while in other embodiments, an actuator module can include the cup magnet module and no bucking magnet.

In some embodiments, an actuator module can include a ring magnet, a yoke, and no bucking magnet. In other embodiments, an actuator module can include a ring magnet, a yoke, and one or more bucking magnets.

In some embodiments, the actuator module can include one or more radially magnetized magnets accompanied by zero, one, or more bucking magnets.

The magnets of actuator module 100 can be an iron magnet, a neodymium magnet, or a ferrite magnet, such as one composed of iron and nickel. In some embodiments, one or more of the magnets of actuator module 100 can be replaced by an electromagnet. In some embodiments, actuator module 100 can include high permeability materials.

In general, the relative polarities of the magnets, as shown with respect to FIG. 4, should be respected, such that reversing the polarity of one of the magnets shown in FIG. 4 should be accompanied by a reversal of the polarities of the other magnets.

In general, the actuator modules described above can be used in a variety of applications. For example, in some embodiments, actuator module 100 can be used to drive a panel of a panel audio loudspeaker, such as a distributed mode loudspeaker (DML). Such loudspeakers can be integrated into a mobile device, such as a mobile phone. For example, referring to FIG. 7, a mobile device 700 includes a device chassis 702 and a touch panel display 704 including a flat panel display (e.g., an OLED or LCD display panel) that integrates a panel audio loudspeaker. Mobile device 700 interfaces with a user in a variety of ways, including by displaying images and receiving touch input via touch panel display 704. Typically, a mobile device has a depth (in the z-direction) of approximately 10 mm or less, a width (in the x-direction) of 60 mm to 80 mm (e.g., 68 mm to 72 mm), and a height (in the y-direction) of 100 mm to 160 mm (e.g., 138 mm to 144 mm).

Mobile device 700 also produces audio output. The audio output is generated using a panel audio loudspeaker that creates sound by causing the flat panel display to vibrate. The display panel is coupled to an actuator, such as a distributed mode actuator, or DMA. The actuator is a movable component arranged to provide a force to a panel, such as touch panel display 704, causing the panel to vibrate. The vibrating panel generates human-audible sound waves, e.g., in the range of 20 Hz to 20 kHz.

In addition to producing sound output, mobile device 700 can also produce haptic output using the actuator. For example, the haptic output can correspond to vibrations in the range of 180 Hz to 300 Hz.

Figure 7:
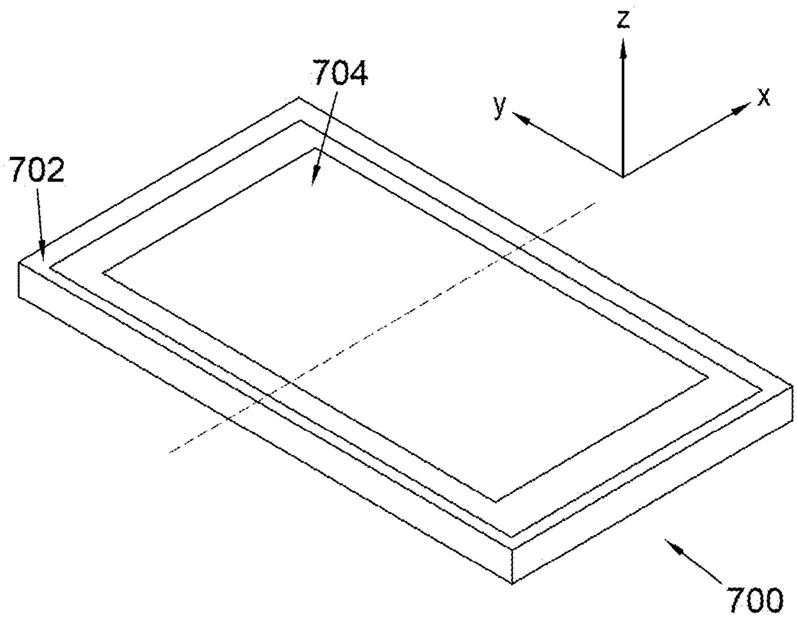
FIG. 7 is a perspective view of an embodiment of a mobile device.
Figure 8:
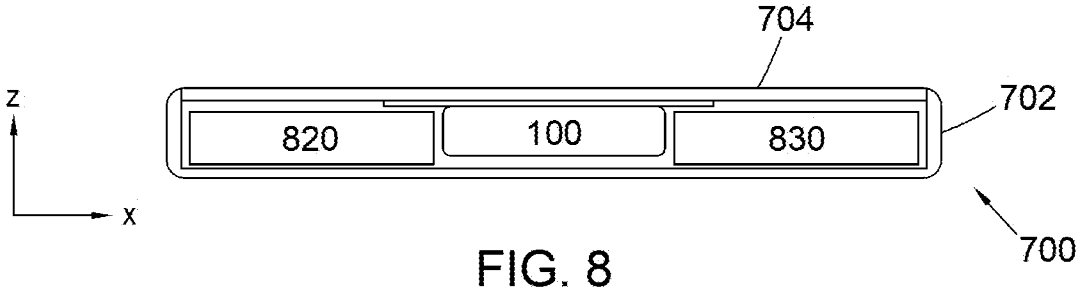
FIG. 8 is a schematic cross-sectional view of the mobile device of FIG. 7.

FIG. 7 also shows a dashed line that corresponds to the cross-sectional direction shown in FIG. 8. Referring to FIG. 7, a cross-section of mobile device 700 illustrates device chassis 702 and touch panel display 704. Device chassis 702 has a depth measured along the z-direction and a width measured along the x-direction. Device chassis 702 also has a back panel, which is formed by the portion of device chassis 702 that extends primarily in the xy-plane. Mobile device 700 includes actuator module 100, which is housed behind display 704 in chassis 702 and attached to the back side of display 704. For example, PSA 112 can attach actuator module 100 to display 704. Generally, actuator module 100 is sized to fit within a volume constrained by other components housed in the chassis, including an electronic control module 820 and a battery 830.

Figure 9:
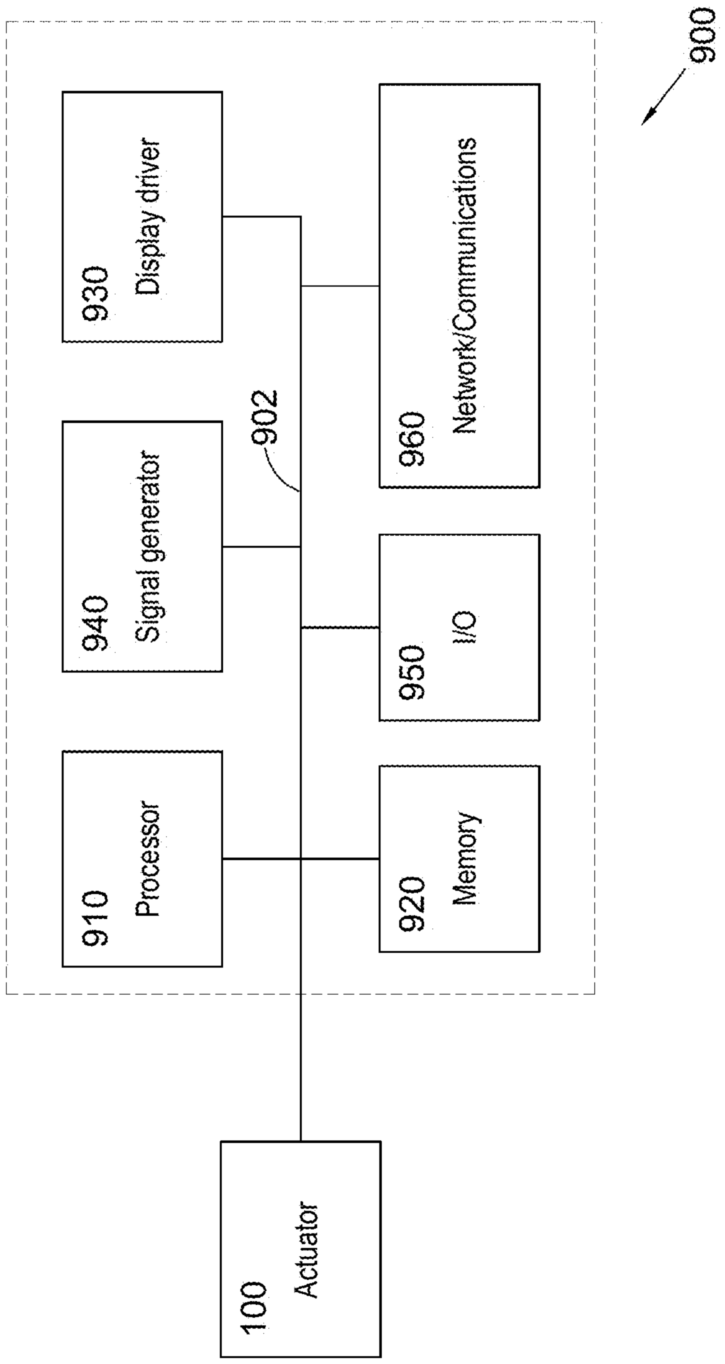
FIG. 9 is a schematic diagram of an embodiment of an electronic control module for a mobile device.

In general, the disclosed actuators are controlled by an electronic control module, e.g., electronic control module 820 in FIG. 8 above. In general, electronic control modules are composed of one or more electronic components that receive input from one or more sensors and/or signal receivers of the mobile phone, process the input, and generate and deliver signal waveforms that cause actuator module 100 to provide a suitable haptic response. Referring to FIG. 9, an exemplary electronic control module 900 of a mobile device, such as mobile device 700, includes a processor 910, memory 920, a display driver 930, a signal generator 940, an input/output (I/O) module 950, and a network/communications module 960. These components are in electrical communication with one another (e.g., via a signal bus 902) and with actuator module 100.

Processor 910 may be implemented as any electronic device capable of processing, receiving, or transmitting data or instructions. For example, processor 910 can be a microprocessor, a central processing unit (CPU), an application-specific integrated circuit (ASIC), a digital signal processor (DSP), or combinations of such devices.

Memory 920 has various instructions, computer programs or other data stored thereon. The instructions or computer programs may be configured to perform one or more of the operations or functions described with respect to the mobile device. For example, the instructions may be configured to control or coordinate the operation of the device's display via display driver 930, signal generator 940, one or more components of I/O module 950, one or more communication channels accessible via network/communications module 960, one or more sensors (e.g., biometric sensors, temperature sensors, accelerometers, optical sensors, barometric sensors, moisture sensors and so on), and/or actuator module 100.

Signal generator 940 is configured to produce AC waveforms of varying amplitudes, frequency, and/or pulse profiles suitable for actuator module 100 and producing acoustic and/or haptic responses via the actuator. Although depicted as a separate component, in some embodiments, signal generator 940 can be part of processor 910. In some embodiments, signal generator 940 can include an amplifier, e.g., as an integral or separate component thereof.

Memory 920 can store electronic data that can be used by the mobile device. For example, memory 920 can store electrical data or content such as, for example, audio and video files, documents and applications, device settings and user preferences, timing and control signals or data for the various modules, data structures or databases, and so on. Memory 920 may also store instructions for recreating the various types of waveforms that may be used by signal generator 940 to generate signals for actuator module 100. Memory 920 may be any type of memory such as, for example, random access memory, read-only memory, Flash memory, removable memory, or other types of storage elements, or combinations of such devices.

As briefly discussed above, electronic control module 900 may include various input and output components represented in FIG. 9 as I/O module 950. Although the components of I/O module 950 are represented as a single item in FIG. 9, the mobile device may include a number of different input components, including buttons, microphones, switches, and dials for accepting user input. In some embodiments, the components of I/O module 950 may include one or more touch sensor and/or force sensors. For example, the mobile device's display may include one or more touch sensors and/or one or more force sensors that enable a user to provide input to the mobile device.

Each of the components of I/O module 950 may include specialized circuitry for generating signals or data. In some cases, the components may produce or provide feedback for application-specific input that corresponds to a prompt or user interface object presented on the display.

As noted above, network/communications module 960 includes one or more communication channels. These communication channels can include one or more wireless interfaces that provide communications between processor 910 and an external device or other electronic device. In general, the communication channels may be configured to transmit and receive data and/or signals that may be interpreted by instructions executed on processor 910. In some cases, the external device is part of an external communication network that is configured to exchange data with other devices. Generally, the wireless interface may include, without limitation, radio frequency, optical, acoustic, and/or magnetic signals and may be configured to operate over a wireless interface or protocol. Example wireless interfaces include radio frequency cellular interfaces, fiber optic interfaces, acoustic interfaces, Bluetooth interfaces, Near Field Communication interfaces, infrared interfaces, USB interfaces, Wi-Fi interfaces, TCP/IP interfaces, network communications interfaces, or any conventional communication interfaces.

In some implementations, one or more of the communication channels of network/communications module 960 may include a wireless communication channel between the mobile device and another device, such as another mobile phone, tablet, computer, or the like. In some cases, output, audio output, haptic output or visual display elements may be transmitted directly to the other device for output. For example, an audible alert or visual warning may be transmitted from the mobile device 700 to a mobile phone for output on that device and vice versa. Similarly, the network/communications module 960 may be configured to receive input provided on another device to control the mobile device. For example, an audible alert, visual notification, or haptic alert (or instructions therefor) may be transmitted from the external device to the mobile device for presentation.

The actuator technology disclosed herein can be used in panel audio systems, e.g., designed to provide acoustic and/or haptic feedback. The panel may be a display system, for example based on OLED of LCD technology. The panel may be part of a smartphone, tablet computer, or wearable devices (e.g., smartwatch or head-mounted device, such as smart glasses).

Other embodiments are in the following claims.

What is claimed is:

1. An apparatus, comprising:
- a voice coil defining a coil axis;
- a magnet assembly defining an air gap;
- a frame;
- a baseplate mechanically coupled to the voice coil and to the frame; and
- a pair of springs suspending the magnet assembly from the frame to extend the voice coil into the air gap, each spring of the pair of springs comprising four segments and four corners, each spring defining a corresponding aperture sized to accommodate motion of the magnet assembly along a direction of the coil axis, the four segments comprising:
  - a pair of first segments on opposing sides of the corresponding aperture, each first segment being attached to the frame at an attachment point between corners of the spring; and
  - a pair of second segments on opposing sides of the corresponding aperture, each second segment being mechanically coupled to the magnet assembly,
- wherein the pair of first segments connect to the pair of second segments at the corners of the spring.

2. The apparatus of claim 1, wherein the magnet assembly comprises:
- a first side facing the baseplate; and
- a second side facing away from the baseplate, wherein:
  - a first spring of the pair of springs is attached to the first side of the magnet assembly; and
  - a second spring of the pair of springs is attached to the second side of the magnet assembly.

3. The apparatus of claim 1, wherein each spring of the pair of springs is formed from a single piece of material.

4. The apparatus of claim 1, wherein a width of each spring varies along a perimeter of the spring.

5. The apparatus of claim 1, wherein the magnet assembly comprises a center magnet and a ring magnet, the air gap comprising a space between the center magnet and the ring magnet.

6. The apparatus of claim 1, wherein a width of each spring is a local maximum at a location of the spring where the spring attaches to the frame.

7. The apparatus of claim 1, wherein a width of each second segment is a local maximum at a location of the second segment where the second segment is mechanically coupled to the magnet assembly.

8. The apparatus of claim 1, wherein the baseplate extends in a plane and the coil axis is orthogonal to the plane.

9. The apparatus of claim 1, wherein the pair of first segments extend parallel to each other and the pair of second segments extend perpendicular to the pair of first segments.

10. The apparatus of claim 1, wherein the attachment point between corners of the spring comprises a midpoint of the first segment between the corners of the spring.

11. The apparatus of claim 1, wherein each second segment is mechanically coupled to the magnet assembly at a coupling point between corners of the spring.

12. The apparatus of claim 1, wherein the second segments each comprise a pair of arms extending along a straight line and an indented portion between the arms, the indented portion being offset from the straight line towards the aperture of the corresponding spring.

13. The apparatus of claim 1, wherein a width of the spring is a minimum at the corners of the spring.

14. An apparatus, comprising:
- a voice coil defining a coil axis;
- a magnet assembly defining an air gap;
- a frame;
- a baseplate mechanically coupled to the voice coil and to the frame; and
- a pair of springs suspending the magnet assembly from the frame to extend the voice coil into the air gap, each spring of the pair of springs comprising four segments and four corners, each spring defining a corresponding aperture sized to accommodate motion of the magnet assembly along a direction of the coil axis, the four segments comprising:
  - a pair of first segments on opposing sides of the corresponding aperture, each first segment being attached to the frame at an attachment point between corners of the spring; and a pair of second segments on opposing sides of the corresponding aperture, each second segment being mechanically coupled to the magnet assembly, wherein the pair of first segments extend parallel to each other and the pair of second segments extend perpendicular to the pair of first segments.

15. An apparatus, comprising:

a voice coil defining a coil axis;

a magnet assembly defining an air gap;

a frame;

a baseplate mechanically coupled to the voice coil and to the frame; and a pair of springs suspending the magnet assembly from the frame to extend the voice coil into the air gap, each spring of the pair of springs comprising four segments and four corners, each spring defining a corresponding aperture sized to accommodate motion of the magnet assembly along a direction of the coil axis, the four segments comprising:

a pair of first segments on opposing sides of the corresponding aperture, each first segment being attached to the frame at an attachment point between corners of the spring, wherein the attachment point of a first segment comprises a midpoint of the first segment between the corners of the spring; and a pair of second segments on opposing sides of the corresponding aperture, each second segment being mechanically coupled to the magnet assembly.

16. An apparatus, comprising:

a voice coil defining a coil axis;

a magnet assembly defining an air gap;

a frame;

a baseplate mechanically coupled to the voice coil and to the frame; and a pair of springs suspending the magnet assembly from the frame to extend the voice coil into the air gap, each spring of the pair of springs comprising four segments and four corners, each spring defining a corresponding aperture sized to accommodate motion of the magnet assembly along a direction of the coil axis, the four segments comprising:

a pair of first segments on opposing sides of the corresponding aperture, each first segment being attached to the frame at an attachment point between corners of the spring; and a pair of second segments on opposing sides of the corresponding aperture, each second segment being mechanically coupled to the magnet assembly at a coupling point between corners of the spring.

17. The apparatus of claim 16, wherein the coupling point between corners of the spring comprises a midpoint of a second segment between the corners of the spring.

18. The apparatus of claim 16, wherein each second segment has a maximum width at the coupling point.

19. An apparatus, comprising:

a voice coil defining a coil axis;

a magnet assembly defining an air gap;

a frame;

a baseplate mechanically coupled to the voice coil and to the frame; and a pair of springs suspending the magnet assembly from the frame to extend the voice coil into the air gap, each spring of the pair of springs comprising four segments and four corners, each spring defining a corresponding aperture sized to accommodate motion of the magnet assembly along a direction of the coil axis, the four segments comprising:

a pair of first segments on opposing sides of the corresponding aperture, each first segment being attached to the frame at an attachment point between corners of the spring; and a pair of second segments on opposing sides of the corresponding aperture, wherein each second segment:

is mechanically coupled to the magnet assembly, and comprises a pair of arms extending along a straight line and an indented portion between the arms, the indented portion being offset from the straight line towards the aperture of the corresponding spring.

20. The apparatus of claim 12, wherein the indented portions are each at a midpoint of the corresponding second segments.

21. The apparatus of claim 12, wherein a width of each second segment is a maximum at the corresponding indented portion.

22. An apparatus, comprising:

a voice coil defining a coil axis;

a magnet assembly defining an air gap;

a frame;

a baseplate mechanically coupled to the voice coil and to the frame; and a pair of springs suspending the magnet assembly from the frame to extend the voice coil into the air gap, each spring of the pair of springs comprising four segments and four corners, each spring defining a corresponding aperture sized to accommodate motion of the magnet assembly along a direction of the coil axis, the four segments comprising:

a pair of first segments on opposing sides of the corresponding aperture, each first segment being attached to the frame at an attachment point between corners of the spring; and a pair of second segments on opposing sides of the corresponding aperture, each second segment being mechanically coupled to the magnet assembly, wherein a width of the spring is a minimum at the corners of the spring.

* * * * *